United States Patent [19]

Nakajima

[11] Patent Number: 5,555,314
[45] Date of Patent: Sep. 10, 1996

[54] FINGERPRINT DATA PROCESSING METHOD

[75] Inventor: Tatsushi Nakajima, Osaka, Japan

[73] Assignees: Ezel Inc.; Sharp Corporation, both of Tokyo, Japan

[21] Appl. No.: 232,414

[22] Filed: Apr. 25, 1994

Related U.S. Application Data

[63] Continuation of Ser. No. 906,847, Jun. 30, 1992, abandoned.

[30] Foreign Application Priority Data

| Jul. 4, 1991 | [JP] | Japan | 3-190590 |
| Jul. 4, 1991 | [JP] | Japan | 3-190592 |

[51] Int. Cl.⁶ ............................................. G06K 9/00
[52] U.S. Cl. .......................... 382/124; 382/125; 382/256
[58] Field of Search .............................. 382/2, 4, 5, 124, 382/125, 256

[56] References Cited

U.S. PATENT DOCUMENTS

| 4,047,154 | 9/1977 | Vitols et al. | 340/146.3 |
| 4,581,760 | 4/1986 | Schiller et al. | 382/4 |
| 4,607,384 | 8/1986 | Brooks | 382/4 |
| 4,641,350 | 2/1987 | Bunn | 382/4 |
| 4,723,298 | 2/1988 | Schiller | 382/4 |
| 4,817,183 | 3/1989 | Sparrow | 382/4 |
| 4,827,527 | 5/1989 | Morita et al. | 382/4 |
| 4,872,203 | 10/1989 | Asai et al. | 382/4 |
| 5,040,220 | 8/1991 | Iwamatsu | 381/83 |
| 5,040,224 | 8/1991 | Hara | 382/4 |
| 5,054,089 | 10/1991 | Uchida et al. | 382/4 |
| 5,073,949 | 12/1991 | Takeda et al. | 382/2 |

FOREIGN PATENT DOCUMENTS

| 0173972 | 3/1986 | European Pat. Off. | G06K 9/00 |
| 8706378 | 10/1987 | WIPO | G07C 9/00 |
| WO87/06378 | 10/1987 | WIPO | G07C 9/00 |

OTHER PUBLICATIONS

Stock, "Automatic Fingerprint Reading", Proceedings of the Carnahan Conference of Electronic Crime Countermeasures, Apr. 1972, pp. 16–28.

Robert M. Stock, Automatic Fingerprint Reading, Proc. of the Carnahan Conf. on Electronic Crime Countermeasures, Apr. 19, 1972, pp. 16–28.

*Primary Examiner*—Jose L. Couso
*Assistant Examiner*—Matthew C. Bella
*Attorney, Agent, or Firm*—Cushman, Darby & Cushman

[57] ABSTRACT

The present invention provides a method of processing an unknown physical fingerprint for use in a data processing system to verify/identify an unknown fingerprint. The method involves obtaining an unknown fingerprint image that includes images of ridges, binarizing the images of ridges in the unknown fingerprint image, generating an image with fused ridges by expanding the images of ridges in the binarized image, shrinking the image with fused ridges to create a scaled-down image, and masking a first portion of the unknown fingerprint image with the scaled-down image so as to create a modified image of the unknown fingerprint.

4 Claims, 3 Drawing Sheets

FINGERPRINT DATA PROCESSING METHOD

This is a continuation of application No. 07/906,847, filed on Jun. 30, 1992, now abandoned, which was abandoned upon the filing hereof.

FIELD OF THE INVENTION

The present invention relates to fingerprint verification, especially to a method for extracting a reference point of a fingerprint image and to a method of eliminating false fingerprint minutiae that may have been input.

BACKGROUND OF THE INVENTION

The minutiae of a fingertip are the ends and bifurcations of the ridges of a fingerprint. A fingerprint verification method using the minutiae characteristics requires a large amount of data and is dependant on the data being reliable. The precise input of the minutiae is a prerequisite for the successful operation of such method, and the verification depends upon the quality of the fingerprint image.

A fingerprint image inputted through a camera or other such device usually does not consist of a total fingerprint, but instead usually consists of a partial image of a fingerprint. End points are therefore generated at the points where ridges are cut by the periphery of the image. Given that such end points are not part of the minutiae, they should be distinguished from the real minutiae characteristics. An established method for performing such distinguishing is not known.

For a fingerprint verification using the minutiae characteristics, the determination of which part of a fingerprint image will be the object for the comparison is an important problem because the choice of the object area will affect the results of the verification. Therefore, in many cases, the center or core of a fingerprint image is adopted as the reference point of the object area. However, the concept of identifying the center point has not yet been refined.

SUMMARY OF THE INVENTION

An object of the present invention is to provide a fingerprint data processing method which can distinguish and reduce false end points generated around the frame of the image when fingerprint minutiae are input. Another object of the present invention is to provide a method for extracting a reference point which can easily be determined.

According to the present invention, an fingerprint image which has been inputted is swelled and then shrunk to a flat image that is smaller than the original fingerprint image. The flat image is used as a mask for extracting the significant area of the fingerprint image to be examined. By so doing, it is possible to reduce the false end points which are created around the frame of an image and to input only real minutiae.

According to the present invention, a reference point is extracted from a distribution of a number of cross points where each scan line crosses the edge of a configuration area adjacent to an background area. The maximal peak of the distribution is deemed as the reference point.

PREFERRED EMBODIMENT OF THE PRESENT INVENTION

Hereinafter, an embodiment of the fingerprint data processing method according to the present invention is described with reference to the attached drawings.

Figure 1:
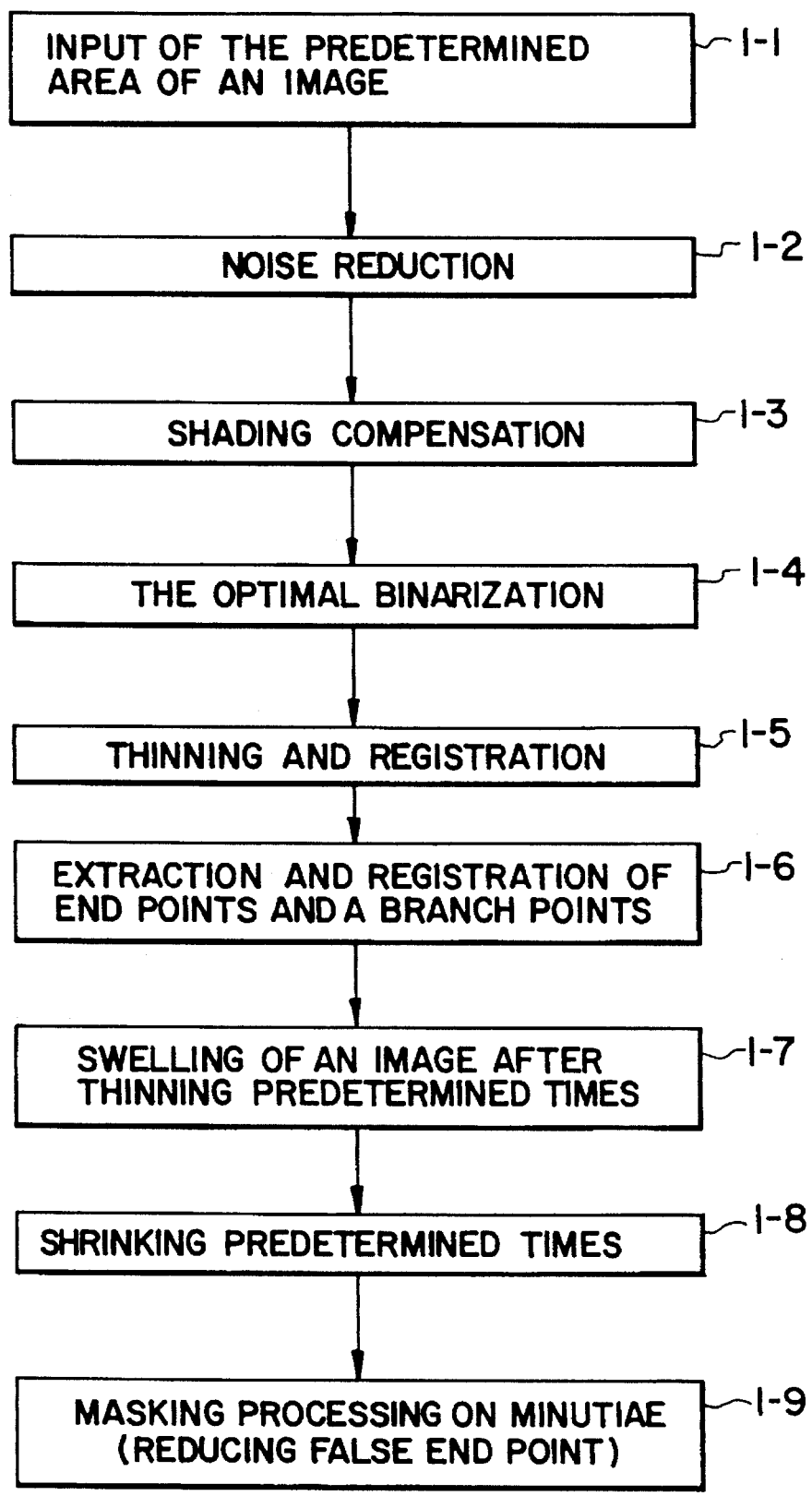
FIG. 1 shows a flow-chart of an embodiment of a fingerprint data processing method according to the present invention.

As is show in step 1-1 of FIG. 1, a fingerprint image is input by a well-known method such as the total reflection method. In step 1-2, noise is reduced by a median-filter or by some other method. The image of the ridge is made clear by performing shading compensation in step 1-3 and the image is binarized into the optimal value in step 1-4. Ridge thinning is executed and the thinned image is recorded in step 1-5. In step 1-6, end points and branch points are extracted from the thinned image and the image is recorded in a memory.

Figure 2:
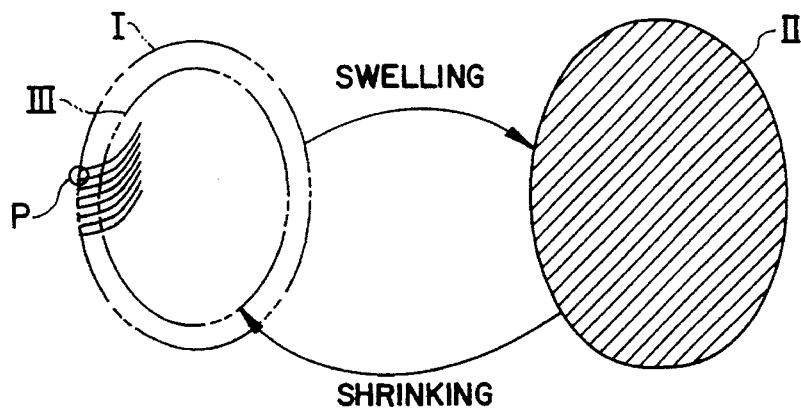
FIG. 2 shows the process for generating a mask that is used to mask out false end points in the embodiment illustrated in FIG. 1.

The thinned image is then swelled a predetermined number of times and the ridges are fused in step 1-7. FIG. 2 shows a thinned image I in which false end point "P" is generated around the frame of the image, and an image II which has been swelled and fused on a thinned image. Image II completely covers image I and comprises all the ridges and minutiae of image I.

The image from step 1-7 (image II in FIG. 2) is shrunk a predetermined number of times in step 1-8. As shown in FIG. 2, shrunk image III is smaller than thinned image I. Image III does not include the area around the frame of image I. The area around the frame can therefore be extracted from image I by using image III as a mask image.

The number of times the swelling of step 1-7 and the shrinking of step 1-8 are performed is determined by experience and varies with the size and resolution of the image. It is also possible to ascertain the completion point of the fuse according to the decrease of the change of area by determining the area every time on every swelling. The completion point of the shrinking can be ascertained by the steps of: i) determining Feret's diameter of the masked image, ii) comparing this to the Feret's diameter of image I, and iii) judging whether shrinking is complete according to the decrease in the ratio of the Feret's diameters of the masked image and of image I.

As described, false end points are surely reduced and a precise minutiae network can be generated because the mask reduced the area around the frame of the original image.

Another embodiment which is concerned with reference point extraction is shown in FIGS. 3 to 6.

Figure 3:
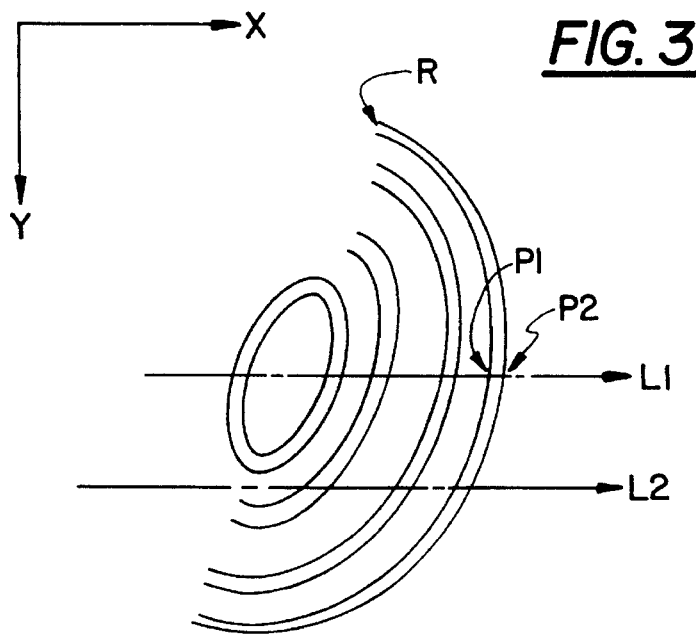
FIG. 3 shows a fingerprint image which feature the ridges, scan lines, and the cross points of the ridges and scan lines as employed in the embodiment illustrated in FIG. 1.

FIG. 3 shows a fingerprint image as a model. Ridge "R" is shown by a configuration brightness ("1", for example), and other parts are shown by a background brightness ("0", for example). The steps of noise reduction, shading compensation, and determination of the optimal threshold are performed as discussed above in order to obtain the binary image. By scanning the fingerprint image in X and Y directions, the cross points of the scan line and the ridges are obtained. In FIG. 3, scan lines "L1" and "L2" are shown.

There are two patterns of ridges, arch-type and whorl-type. As for the arch-type, experiments show that the center part will be apparent from the distribution of "cross points". The cross points of the edge of ridge "R" and scan lines L1 and L2 are adopted as the "cross points" here. The representative value of the number of ridges can be obtained directly from a binary image without thinning ridges and the processing can be performed in high speed.

Either one or both of the points at which the brightness changes (i.e., either from background brightness to configuration brightness or from configuration brightness to background brightness) can be adopted as the edges of the ridges. When both are adopted, the number of ridges through which each scan line passes across is twice the number of edges. The characteristics of the distribution of the number of edges is equivalent to that of the ridges.

Figure 4:
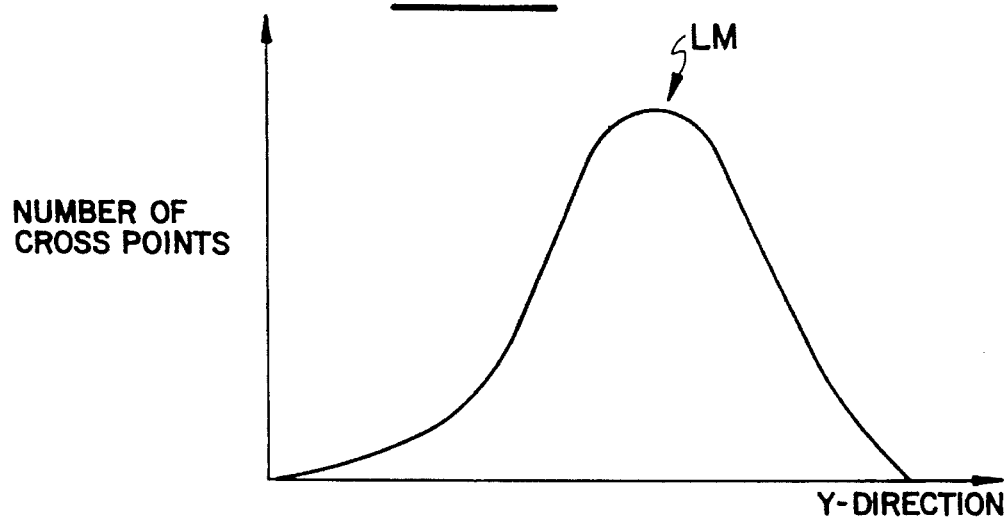
FIG. 4 shows a graph of the distribution of cross points in the Y-direction of the fingerprint image shown in FIG. 3.

The number of cross points of a scan line and a ridge tends to distribute as shown in FIG. 4. It makes a peak around the center of a fingerprint. The coordinates of the point with the maximal value "LM" in both the X and Y directions is settled as a reference point.

Figure 5:
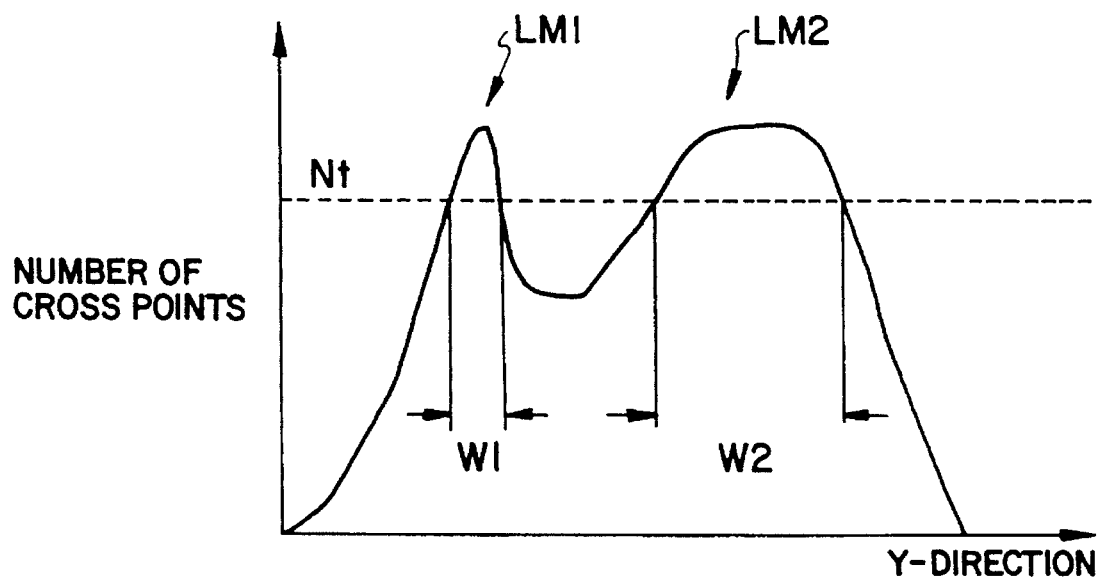
FIG. 5 shows another example of the type of graph illustrated in FIG. 4 which graph includes a sharp noise peak.

In FIG. 5, there are two peaks: the larger sharp peak of LM1 and the smaller, wider peak of LM2. When the distribution of LM1 is less than the predetermined value, LM2 will be adopted as the reference value. Here, the distribution is judged by the width of peak W1 and W2 by cutting the peak at threshold "Nt". In this way, the effect of noise on the determination of the reference point can be prevented by ignoring the peak with narrow distribution.

Figure 6:
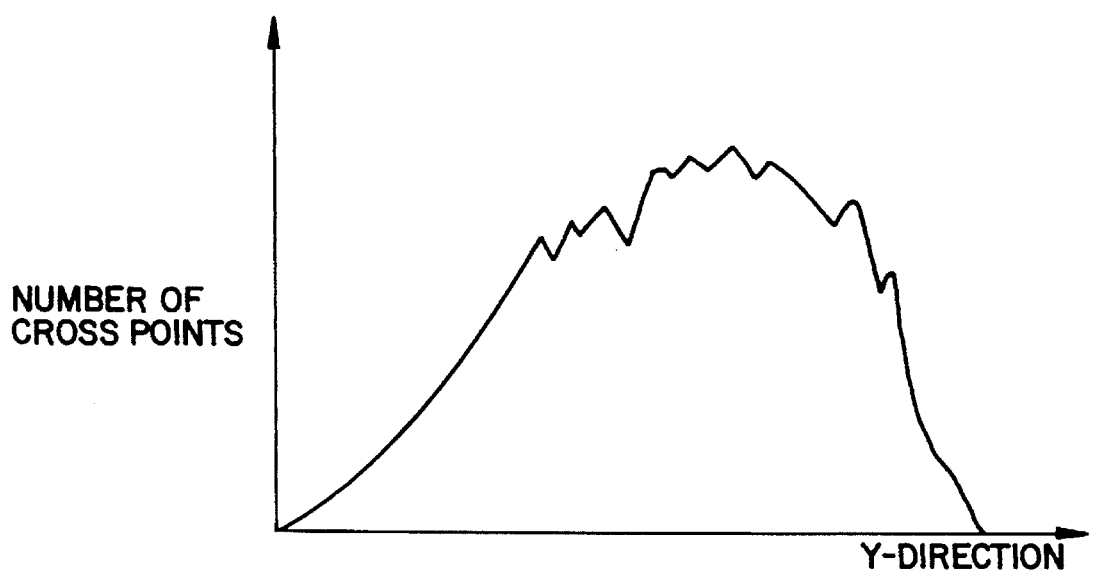
FIG. 6 shows another example of the type of graph illustrated in FIG. 4 which graph includes a non-smooth distribution of cross points.

FIG. 6 shows a peak with a type of noise which causes the jagged or non-smooth distribution of cross points. In this case, the maximal value is judged after smoothing correcting the distribution which was shown by the jagged line.

The processing described is high speed because the cross points of edges of ridges and scan lines are counted. It is possible to overcome the effects of noise on the determination of a reference point by only adopting the peak with equal to or more than the predetermined distribution.

According to the present invention, an inputted fingerprint image is swelled and then shrunk to a flat area smaller than the original fingerprint image. The flat image is used as a mask for extracting significant area of the fingerprint image to be examined. Therefore, it is possible to reduce the false end points around the frame of an image and to input only real minutiae characteristics by the present invention. In addition, the invention allows a reference point to be extracted from a distribution of a number of cross points where each scan line crosses an edge of a configuration area adjacent to an background area. The maximal peak of the distribution is deemed as the reference point. Consequently, the effect of noise on the reference point can be minimized.

What is claimed is:

1. A method of processing an unknown physical fingerprint comprising:
    i) obtaining an unknown fingerprint image that includes images of ridges in said unknown physical fingerprint;
    ii) binarizing said images of ridges in said unknown fingerprint image to produce a binarized image of said ridges;
    iii) generating an image with fused ridges by expanding said images of ridges in said binarized image of said unknown fingerprint;
    iv) shrinking said image with fused ridges to create a scaled-down image; and
    v) masking a first portion of said unknown fingerprint image with said scaled-down image so as to create a modified image of said unknown fingerprint.

2. A method of processing an unknown fingerprint image as defined in claim 1, wherein said shrinking includes:
    i) determining a diameter of said unknown fingerprint image and a diameter of said fused image;
    ii) comparing said diameter of said unknown fingerprint image and said diameter of said fused image; and
    iii) continuing to shrink said fused image until a predetermined relationship between diameter of said fused image and said diameter of said unknown finger image is reached.

3. A method of processing an unknown fingerprint image as defined in claim 1, further comprising:
    i) extracting a second portion of said unknown fingerprint image that was not covered by said scaled-down image during said set of masking a first portion of said unknown fingerprint image.

4. A method of processing an unknown fingerprint image as defined in claim 3, wherein said second portion of said unknown fingerprint image corresponds to peripheral edge portion of said unknown fingerprint image.

* * * * *